(12) United States Patent
Kluth et al.

(10) Patent No.: US 10,337,461 B2
(45) Date of Patent: Jul. 2, 2019

(54) METHOD AND APPARATUS FOR DIAGNOSING A WATER INJECTION INTO A COMBUSTION CHAMBER OF AN INTERNAL COMBUSTION ENGINE

(71) Applicant: Robert Bosch GmbH, Stuttgart (DE)

(72) Inventors: Carsten Kluth, Stuttgart (DE); Johannes Hoegl, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 393 days.

(21) Appl. No.: 15/292,726

(22) Filed: Oct. 13, 2016

(65) Prior Publication Data

US 2017/0114754 A1 Apr. 27, 2017

(30) Foreign Application Priority Data

Oct. 23, 2015 (DE) .......................... 10 2015 220 721

(51) Int. Cl.
| | |
|---|---|
| *F02M 25/022* | (2006.01) |
| *F02M 25/03* | (2006.01) |
| *F02D 19/12* | (2006.01) |
| *F02B 47/02* | (2006.01) |
| *F02D 41/22* | (2006.01) |

(52) U.S. Cl.
CPC ......... *F02M 25/0227* (2013.01); *F02B 47/02* (2013.01); *F02D 19/12* (2013.01); *F02D 41/22* (2013.01); *F02M 25/03* (2013.01); *F02D 2200/025* (2013.01); *Y02T 10/40* (2013.01)

(58) Field of Classification Search
CPC ............. F02M 25/0227; F02M 25/022; F02M 25/025; F02M 25/03; F02M 25/028; F02D 41/22; F02D 19/12; F02D 35/027; F02D 2200/025; F02B 47/00; F02B 47/02; F02B 77/085
See application file for complete search history.

(56) References Cited

U.S. PATENT DOCUMENTS

| | | | | |
|---|---|---|---|---|
| 4,542,727 A * | 9/1985 | Britsch | .................... | F02P 5/152 123/406.3 |
| 5,542,379 A * | 8/1996 | Kessler | .................... | B01F 5/16 123/25 C |
| 5,832,880 A * | 11/1998 | Dickey | .................... | F02B 1/12 123/25 C |
| 7,676,321 B2 * | 3/2010 | Andri | ...................... | B60K 6/24 123/304 |
| 8,327,826 B2 * | 12/2012 | Okoshi | .................... | F02P 5/152 123/406.23 |
| 8,554,445 B2 * | 10/2013 | Leone | .................... | F02D 35/027 123/1 A |
| 9,127,607 B2 * | 9/2015 | Glugla | ................ | F02D 41/0085 |

(Continued)

FOREIGN PATENT DOCUMENTS

| | | |
|---|---|---|
| DE | 3142729 A1 | 5/1983 |
| DE | 3928611 A1 | 3/1991 |
| DE | 102014222474 A1 | 5/2016 |

*Primary Examiner* — Grant Moubry (74) *Attorney, Agent, or Firm* — Norton Rose Fulbright US LLP; Gerard Messina (57) ABSTRACT

A method for diagnosing a water injection into a combustion chamber of an internal combustion engine, a knock susceptibility of the internal combustion engine being ascertained from signals of a knock sensor and the knock susceptibility being evaluated in order to diagnose the water injection.

9 Claims, 3 Drawing Sheets

(56) References Cited

U.S. PATENT DOCUMENTS

| | | | |
|---|---|---|---|
| 9,291,125 B2* | 3/2016 | Yoshihara | F02D 35/027 |
| 2003/0029416 A1* | 2/2003 | Sauler | F02D 37/02 |
| | | | 123/299 |
| 2014/0102403 A1 | 4/2014 | Yoshihara et al. | |

* cited by examiner

METHOD AND APPARATUS FOR DIAGNOSING A WATER INJECTION INTO A COMBUSTION CHAMBER OF AN INTERNAL COMBUSTION ENGINE

CROSS REFERENCE

The present application claims the benefit under 35 U.S.C. § 119 of German Patent Application No. DE 102015220721.8 filed on Oct. 23, 2015, which is expressly incorporated herein by reference in its entirety.

FIELD

The present invention relates to a method and an apparatus for diagnosis of a water injection into a combustion chamber of an internal combustion engine.

BACKGROUND INFORMATION

German Patent No. DE 39 28 611 describes a method and an apparatus for water injection into a combustion chamber of an internal combustion engine.

SUMMARY

An example method according to the present invention and example apparatus according to the present invention for diagnosing a water injection into a combustion chamber of an internal combustion engine may have the advantage that the functional capability of the water injection can be checked. Because knock sensors are provided in any case in most modern engines, diagnosing water injection does not require provision of a further sensor exclusively for that purpose. The water injection is thus diagnosed particularly simply and inexpensively by evaluating data that are already present for operation of the internal combustion engine. A knock susceptibility of the internal combustion engine is ascertained particularly easily in this context, this indication being independent of the type of knock sensor used. The example method according to the present invention and apparatus according to the present invention can therefore be utilized without a large outlay for adaptation to different sensor types. The example method according to the present invention and apparatus according to the present invention are thus very inexpensive, and reliably detect a water injection malfunction.

Water injection is diagnosed in particularly simple fashion by the fact that the knock susceptibility of the internal combustion engine is compared with a comparison value, different comparison values being provided for different operating ranges of the internal combustion engine. A water injection diagnosis can already be made with high quality by way of this relatively simple measure. An improved water injection diagnosis can be made by way of a first and second measurement in a predetermined operating range. A very accurate water injection diagnosis can be made by comparing the two measurements. This effect is particularly pronounced when for one of the measurements, the quantity that is injected into the combustion chamber is equal to zero, i.e., when no injection of water into the combustion chamber occurs. If the quantity of water injected is increased between the first measurement of knock susceptibility and the second measurement of knock susceptibility, then the knock susceptibility should be decreased if the water injection is operating correctly. If this is not found as a result of the measurement, then a water injection malfunction can be diagnosed. If the quantity of water injected is reduced between the first measurement of knock susceptibility and the second measurement of knock susceptibility, the knock susceptibility should then increase. If this is confirmed, the water injection is functioning properly; if it is not confirmed, a water injection malfunction is to be assumed. Both procedures permit simple diagnosis with high accuracy, since even small changes in knock susceptibility are accurately ascertained by comparing the two measurements. With both methods, operation with a reduced water injection quantity should occur only briefly, in order to avoid knocking operation of the internal combustion engine. A two-step method is particularly advantageous, in which operation of the internal combustion engine with a decreased water injection quantity occurs only when a malfunction is suspected. For this, firstly the absolute values of the knock susceptibility are compared with comparison values for the relevant operating range; and if the comparison values are exceeded, the water injection is diagnosed as potentially faulty. A method is then performed in which two measured values with different water injection quantities are compared. Since the second step is performed only when a fault is suspected, intermittent operation with a decreased water quantity (in which an elevated knock susceptibility of course exists) can be largely avoided or is implemented only when absolutely necessary. In an internal combustion engine having multiple cylinders, the method can be carried out for diagnosis of each cylinder individually. In a further embodiment in the context of an internal combustion engine having multiple cylinders, measured values of different cylinders can also be compared with one another, thereby improving the water injection diagnosis for individual cylinders thanks to the cross-comparison. The intensity of a combustion noise, or the frequency of knocking combustion events, or a knock limit for an ignition angle ascertained by a knock control system, are suitable in particular for knock susceptibility.

Exemplifying embodiments of the present invention are depicted in the figures and are explained in further detail below.

DETAILED DESCRIPTION OF EXAMPLE EMBODIMENTS

Figure 1:
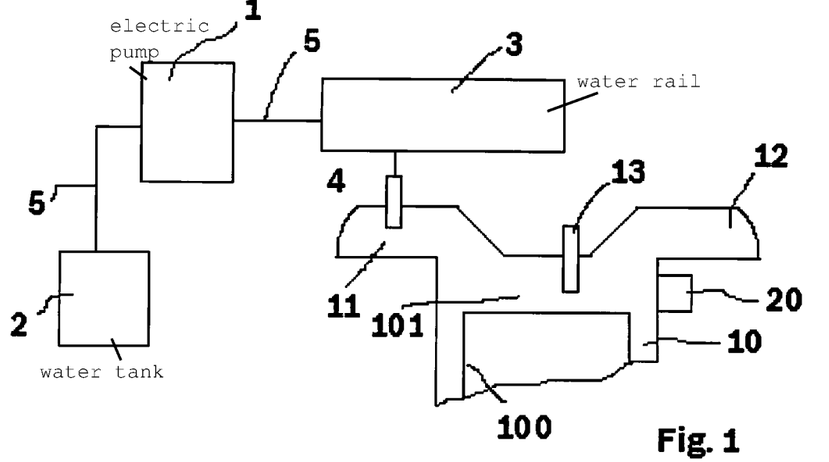
FIGS. 1 to 3 show various configurations of internal combustion engines having a water injection.

FIG. 1 schematically shows an engine, i.e., an internal combustion engine, having a cylinder 10. A combustion chamber 101 is defined in cylinder 10 by a piston 100. Air for combustion is conveyed through an intake duct 11, and fuel for combustion in cylinder 10 is conveyed through a fuel injector 13, to cylinder 10 and to combustion chamber 101. The exhaust gases occurring in that context are discharged from cylinder 10 through exhaust duct 12. This is a usual gasoline or diesel engine that is depicted merely schematically in FIG. 1. In particular, further control elements such as air inlet valves and exhaust gas outlet valves, means for influencing the air flow through intake duct 11 (for example, a throttle valve), a spark plug or a glow plug, and other elements of usual gasoline engines and diesel engines, are not depicted, since they are not important for an understanding of the invention. A system for water injection into intake duct 11 is also shown in FIG. 1. The water injection system is made up of a water tank 2 that is connected via a connecting line 5 to an electric pump 1. Through connecting line 5, water can flow out of tank 2 to electric pump 1 or can be drawn out of the tank by electric pump 1. That side of electric pump 1 which is connected via connecting line 5 to water tank 2 will hereinafter be called an "inflow." Electric pump 1 furthermore has a high-pressure output that is connected via connecting line 5 to a water rail 3. Water rail 3 is a pressure reservoir that can be filled with water by the electric pump, and is impinged upon by a pressure. Especially in the context of injection into the intake duct, the pressure is relatively low, so that water rail 3 can also be embodied as a simple hose or as a hose distributor. Water rail 3 is then connected via a further connecting line 5 to a water injector 4 that opens into intake duct 11. The water in tank 2 is thus delivered via the inflow of electric pump 1 and is made available at elevated pressure at the high-pressure output of pump 1. This water is then temporarily stored in water rail 3 until it is injected into intake duct 11 through a corresponding opening of water injector 4.

A plurality of water injectors 4 that supply water to a plurality of cylinders 10 can also be connected to water rail 3. Especially in the context of multi-cylinder engines that are usual nowadays in motor vehicles, this is a configuration with which each cylinder can be individually supplied with a quantity of water matched to it.

The injection of water into intake duct 11 generates, together with the fuel injected through fuel injector 13, a mixture of air, fuel, and water in combustion chamber 101 of cylinder 10. Combustion of the air-fuel mixture in the combustion chamber of cylinder 10 then occurs as a result of a corresponding ignition event, either by way of a spark plug or thanks to a self-ignition process in a diesel engine. The water contained in this air-fuel mixture results in effective cooling of combustion chamber 101 in cylinder 10, so that the combustion temperature is reduced and, in the context of use in a gasoline engine, knock susceptibility is decreased. This makes possible an optimized ignition time, which has a positive effect on the efficiency and consumption of the gasoline engine. The production of harmful exhaust gases in gasoline and diesel engines can also be reduced. The introduction of water into a combustion chamber is therefore a measure with which the quality of the combustion in the combustion chamber of a cylinder 10 can be positively influenced. Both the quality of the exhaust gas and the thermal stress on cylinder 10, power output, and fuel consumption can be positively influenced with this measure.

Figure 2:
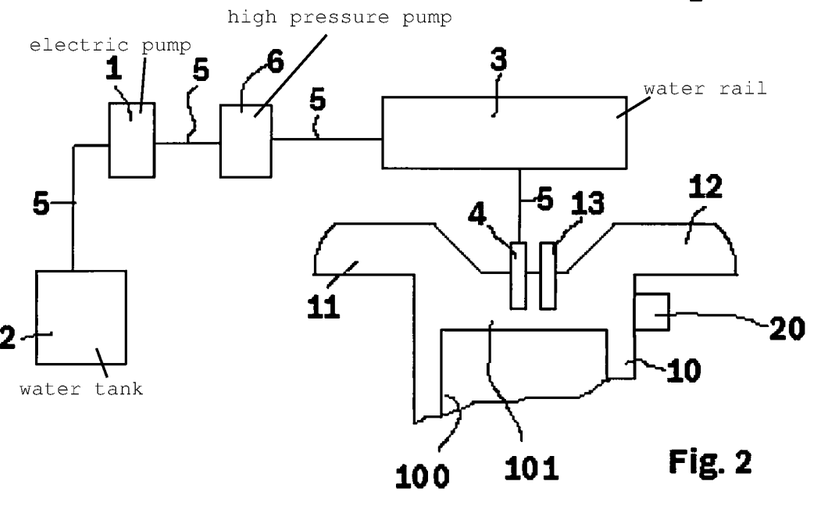

FIG. 2 likewise shows an engine having a system for water injection into the combustion chamber of a cylinder 10. The reference characters 10, 11, 12, 13, 1, 2, 3, 4, 5, 100, 101 again designate the same objects as in FIG. 1. Unlike in FIG. 1, however, water injector 4 is disposed so that it opens not into intake duct 11 but rather directly into combustion chamber 101 of cylinder 10. Injecting water directly into the combustion chamber of cylinder 10 requires appreciably higher pressures than injection into the intake duct. A water pressure of a few bar is sufficient for injecting water into intake duct 11. Because injection into the combustion chamber of cylinder 10 can occur when the air intake valve in the direction of intake duct 11 is already closed and the cylinder is in a compression phase, an appreciably higher pressure of up to approximately 200 bar is necessary for injecting water into a combustion chamber. Water must therefore be stored in water rail 3 at an appreciably higher pressure in order to enable injection directly into the combustion chamber of cylinder 10. A high-pressure pump 6 is disposed for this purpose after electric pump 1. The inflow of high-pressure pump 6 is connected via a connecting line 5 to the high-pressure output of electric pump 1. The high-pressure output of high-pressure pump 6 is connected via a connecting line 5 to water rail 3. The result is to create a configuration in which a pressure is generated which is sufficiently high to allow injection of water directly into the combustion chamber of the engine.

Figure 3:
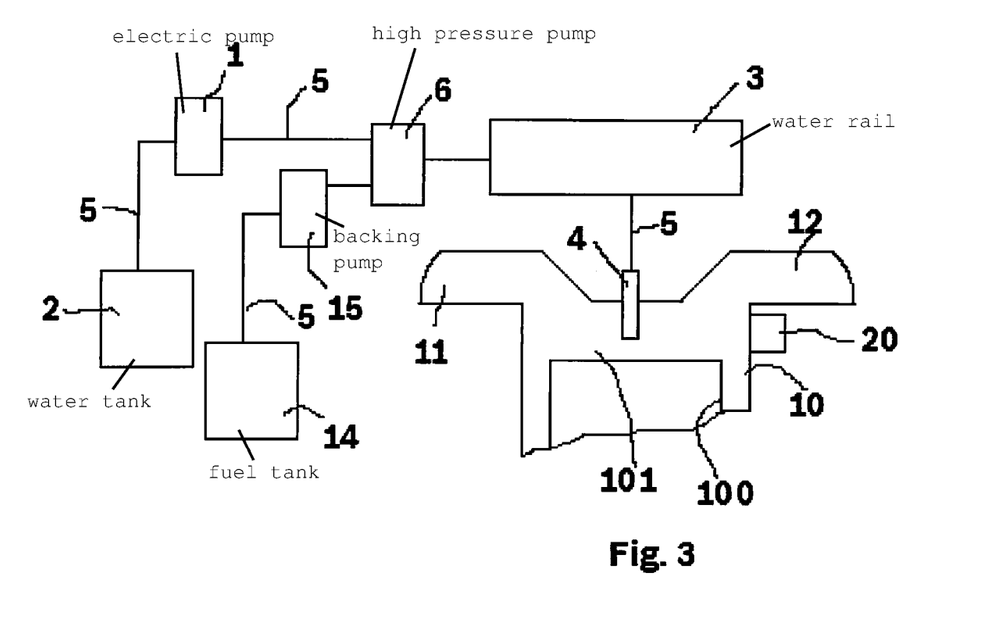

FIG. 3 shows a further form of an engine having a water injection system. The reference characters 1, 2, 3, 4, 5, 10, 11, 12, 13, 100, 101 again designate the same objects as in FIG. 1. FIG. 3 furthermore shows the fuel supply system, having a fuel tank 14 that is connected via a connecting line 5 to a backing pump 15.

Backing pump 15 is connected via a connecting line 5 to a high-pressure pump 6. High-pressure pump 6 is then connected via a connecting line 5 to rail 3. High-pressure pump 6 here has two inflow connectors, the one inflow connector being connected to electric pump 1 by which water is pumped, and the other inflow of high-pressure pump 6 being connected to fuel backing pump 15. High-pressure pump 6 pumps both media, and makes available at its high-pressure outlet an emulsion of the two liquids at a pressure suitable for injection directly into the combustion chamber. Because fuel and water as a rule do not mix, an emulsifier is added to the water so that the blending of water and fuel results in formation of an emulsion of fuel and water. This emulsion is then stored in rail 3 at a correspondingly high pressure and is injected through fuel/water injector 4 directly into combustion chamber 101 of cylinder 10.

Further variations of internal combustion engines with water injection are also possible, and result from modifications of the engines shown in FIGS. 1 to 3. For example, fuel can also be injected into the intake duct, with water likewise injected into the intake duct or else directly into the cylinder. Double fuel injection, both into the intake duct and into the cylinder, can also be used as a further variant. In multi-cylinder engines only individual cylinders, in particular thermally highly stressed cylinders, can be designated for water injection.

FIGS. 1 to 3 additionally show a knock sensor 20 that is mounted on the outer side of cylinder 10. A knock sensor of this kind is a solid-borne sound sensor that can detect acoustic waves in the cylinder resulting from combustion events in combustion chamber 101. A solid-borne sound sensor of this kind is embodied, for example, as a piezo-electric solid-borne sound sensor or as an acceleration sensor, and evaluates the acoustic waves that are transported out of combustion chamber 101 through the material of the cylinder to solid-borne sound sensor 20. Knock sensors 20 of this kind are provided nowadays in a plurality of internal combustion engines in order to optimize operation of an internal combustion engine. Combustion in an internal combustion engine occurs particularly effectively when the operating conditions in combustion chamber 101 occur as close as possible to knocking operation but with no occurrence of knocking. An internal combustion engine is therefore, for maximally effective operation, operated as close as possible to the knock limit of the engine. Since even small variations in operating conditions, for example a slight variation in fuel or variations in the engine operating temperature, can make the difference between non-knocking combustion and knocking combustion, it is necessary to monitor by way of such a knock sensor 20 whether knocking combustion is occurring, and if applicable to prevent knocking by way of corresponding control measures.

In addition to a solid-borne sound sensor, other knock sensors, in particular combustion chamber pressure sensors or ion current sensors, can be used as knock sensors 20. With a combustion chamber pressure sensor, a pressure in combustion chamber 101 is measured directly. A sensor of this kind is, however, usually disposed not on the side wall of cylinder 10 but on the upper side in the vicinity of fuel injection valve 13. Alternatively, it is also possible to use ion current sensors, in which two electrodes project into combustion chamber 101 and have a measurement voltage applied to them. A current flowing as a result of ions between the two electrodes varies depending on the pressure circumstances and also on pressure waves produced in the combustion chamber; this again allows knocking processes in combustion chamber 101 to be detected.

By processing the signal of knock sensor 20, a knock intensity of a combustion event is determined from the measured data; and from the knock intensity of one or more combustion events a knock susceptibility of the internal combustion engine, i.e., of the respective cylinder 10 with which the knock sensors are associated, is determined. Knock events usually occur in a specific frequency range of the sensor signal. The reason for this is that the pressure waves produced in combustion chamber 101 by knocking occur only in a specific frequency range depending on the geometry of the combustion chamber. Further processing of the sensor signals thus usually encompasses firstly a frequency filtering so that only signals in a specific frequency range are examined. If knock sensor 20 is embodied as a solid-borne sound sensor, the measured solid-borne sound signal is then, for example, rectified and integrated in order to determine an indication of the knock intensity in the combustion chamber. This knock intensity is then compared with a reference value, and the difference between the measured knock intensity and the reference value is rated. If the knock intensity exceeds the reference value by a predefined amount, the conclusion is that knocking combustion is present.

If knock sensor 20 is embodied as a solid-borne sound sensor, the knock intensity consists in an intensity of the combustion noise. If knock sensor 20 is embodied as a combustion chamber pressure sensor, the knock intensity is calculated based on the pressure fluctuations or pressure intensity in the combustion chamber. If knock sensor 20 is embodied as an ion current sensor, the knock intensity of a combustion event is calculated via the intensity and fluctuations of the ion current. With all these sensors, the respective signal of the knock sensor can be integrated over a time interval, or peak values of the sensor signal can be used to calculate the knock intensity. Complex evaluation algorithms using energy considerations and Fourier transformations of the signal to calculate the knock intensity are also known. The essential aspect of knock intensity is simply the ability to judge by way of the knock intensity whether or not knocking has occurred in combustion chamber 101.

From the knock intensity thereby ascertained, a knock susceptibility of the relevant cylinder 10 can then be ascertained. The knock susceptibility is also ascertained on the basis of multiple combustion events in a cylinder 10. This can be done, for example, by determining the knock frequency; the knock frequency indicates how often a knocking combustion event has occurred, i.e., how often the knock intensity for the relevant cylinder was rated as a knocking combustion event. The knock frequency can be referred either to a time interval or to the ratio of knocking to non-knocking combustion events. Control intervention by a knock control system can also be viewed as an alternative indication of knock susceptibility. A knock control system usually influences the ignition angle in order to prevent the occurrence of knocking. For this, every time the knock intensity of a combustion event is rated as knocking, the ignition angle is influenced in the direction of a retarded ignition angle, i.e., toward an operating range in which knocking becomes less probable. If no knocking has then occurred over a longer time period, the ignition angle is carefully shifted back toward more-efficient operation, i.e., in the direction of a more advanced ignition angle. The ignition angle outputted by the knock control system thus likewise represents an indication of the knock susceptibility of combustion in a combustion chamber 101.

Proceeding from the knock intensities of several successive combustion events, it is possible to ascertain a knock susceptibility, i.e., the probability that knocking will occur in the relevant cylinder. This involves consideration of the knock intensities of multiple combustion events, for example by adding up the knock intensities and correlating them with the number of combustion events. It is thereby possible to determine a knock susceptibility even when no knocking combustion events have occurred. This method is an alternative to evaluation of the number of knocking combustion events.

Figure 4:
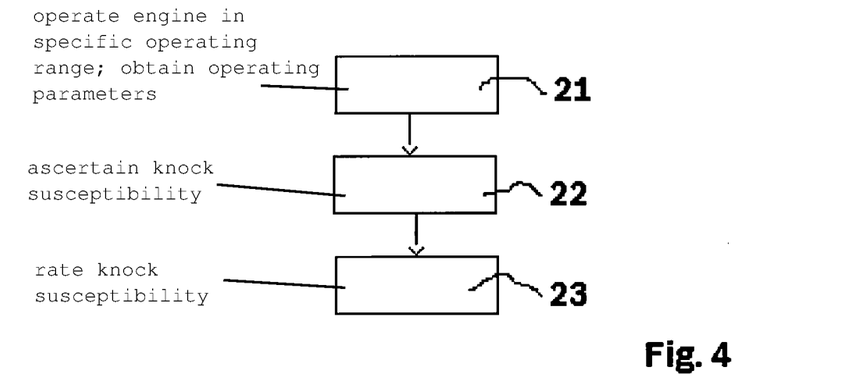
FIG. 4 shows a first method for diagnosis.

FIG. 4 describes a first method for diagnosing the water injections described in FIGS. 1 to 3. In a first step 21, the internal combustion engine is operated for this purpose in a specific operating range. An "operating range" is understood here as a specific range of the parameters relevant to operation of the internal combustion engine, such as ambient conditions, measured values of the relevant sensors, and setting values of the actuators that influence the engine. A range is useful because the successive measurements can thus be compared with one another and can therefore be considered together. Large differences in the operating conditions of the engine, for example first an idle engine speed of approximately 1000 revolutions per minute and then a full-load engine speed, for example 4000 revolutions per minute, result in appreciable differences in knock susceptibility and therefore cannot be considered together. In step 21 the operating parameters of the internal combustion engine, i.e., values such as engine speed, load, air temperature, etc. are therefore firstly ascertained. In the following step 22 the knock susceptibility of the internal combustion engine is then ascertained. A plurality of measurements of multiple combustion events are effected for this purpose, the knock intensity of a combustion event being determined at each measurement. When calculating the knock susceptibility from multiple combustion events it is necessary for the internal combustion engine to be in the same operating range for each of those measurements. Otherwise the measurements cannot be compared with one another because of the different operating conditions. In step 22 the knock susceptibility is therefore calculated from a plurality of measurements of the signals of knock sensor 20.

Step 22 is followed by step 23 in which the knock susceptibility thereby ascertained is rated, the knock susceptibility being compared with a comparison value for the knock susceptibility.

For this, a comparison value for the knock susceptibility is stored for the respective operating range as a function of whether or not a water injection is occurring, or what quantity of water is being injected. A diagnosis of the water injection is then carried out in step 23 on the basis of this comparison. It is possible to establish, in particular, whether or not the water injection is functioning. If the knock susceptibility does not correspond to the expected knock susceptibility for a water injection, in particular if the knock susceptibility is appreciably elevated, it can be established that evidently an insufficient injection of water into the combustion chamber is occurring. Given this result, the water injection would thus be diagnosed as faulty.

This diagnosis does not, however, determine a fault cause, since all that is established is whether or not the water injection occurred. With this type of evaluation a correlation exists between the selection of the operating range and of the comparison value. If the operating ranges are defined to be very narrow or approximately point-like, it is then possible to select, for the assessment as to whether or not water injection is functioning, a comparison value that is very close to normal knock susceptibility operation, and even small deviations in water injection can thus be diagnosed. If the operating range is selected to be wider, the comparison value must then also maintain a correspondingly greater distance from an expected normal operating mode of the internal combustion engine. Correspondingly suitable operating ranges and comparison values must be considered and designed as a function of the respectively desired diagnostic accuracy.

Figure 5:
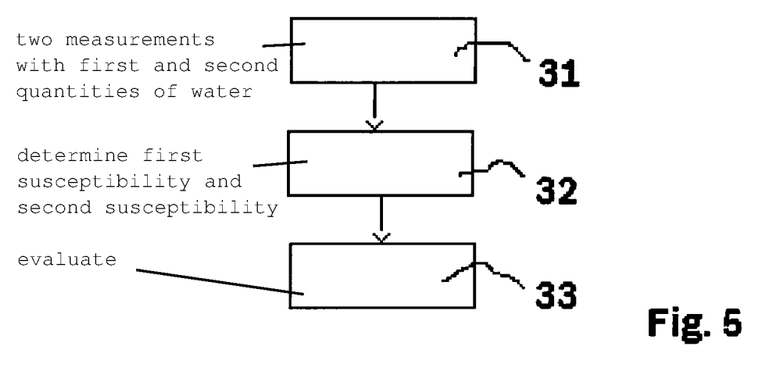
FIG. 5 shows a second method for diagnosis.

FIG. 5 describes a second method for diagnosing water injection. In a first step 31, at least two measurements are made with a first and a second quantity of water into the combustion chamber, and the results of these two measurements, i.e., the knock susceptibilities ascertained from the measurements, are compared with one another. The two measurements are made in the same operating range of the internal combustion engine, so that comparability of the knock susceptibilities thereby ascertained also exists.

The difference between the knock susceptibility ascertained respectively with the first and the second measure is particularly large if one quantity is equal to zero, i.e., if for one measurement no water is injected into the combustion chamber while for the other measurement water is injected into the combustion chamber. The difference is particularly good in this situation, and it is therefore particularly simple to establish a water injection malfunction. In a first step 31, a first and a second measurement are therefore made with a first and a second quantity of water injected into the combustion chamber. The two measurements are made with the internal combustion engine in the same operating range, so that the respectively ascertained knock susceptibility values are comparable with one another.

Step 31 is then followed by step 32, in which a first knock susceptibility and a second knock susceptibility are determined from the two measurements with a different quantity of water injected into the combustion chamber. Step 32 is followed by step 33, in which the two ascertained knock susceptibility values are evaluated in order to arrive at a water injection diagnosis. The specific evaluation in step 33 depends on which of the measurements involved the use of a larger or smaller amount of water. If the first quantity of injected water was less than the second quantity, then a decrease in knock susceptibility between the first measurement and second measurement is to be expected. This decrease in knock susceptibility should furthermore be clearly visible. With a functionally capable water injection it is therefore to be expected that the first knock susceptibility value will be greater than the second knock susceptibility value, and this difference should be greater than a predefined threshold value. If the first knock susceptibility value does not exceed the threshold, or is the same as or even less than the second knock susceptibility value, the water injection is then diagnosed as faulty.

If the quantity of water injected at the first measurement is greater than at the second quantity measurement, an increase in knock susceptibility between the first and the second measurement is then expected. This increase in knock susceptibility also should exceed a threshold value. The water injection is diagnosed as faulty if the second knock susceptibility value exceeds the first knock susceptibility value by less than the threshold value, or if the second knock susceptibility is the same as or less than the first knock susceptibility value. The water injection is correspondingly diagnosed as functionally capable if the second knock susceptibility value (smaller quantity) exceeds the first knock susceptibility value (larger quantity) by more than a threshold value.

The method according to FIG. 5 permits an operating mode in which no water is injected, so that in that context it is possible for knocking combustion events to occur; in principle this is, of course, not desirable. On the other hand, there is an improvement in water injection diagnosis, since particularly reliable and accurate diagnosis can be accomplished by way of the comparative measurement of at least two combustion processes, one occurring with and the other without (or with a reduced) water injection. The advantages and disadvantages of these two procedures, according to either the method of FIG. 4 or the method of FIG. 5, must be correspondingly weighed against each other in the two applications.

Figure 6:
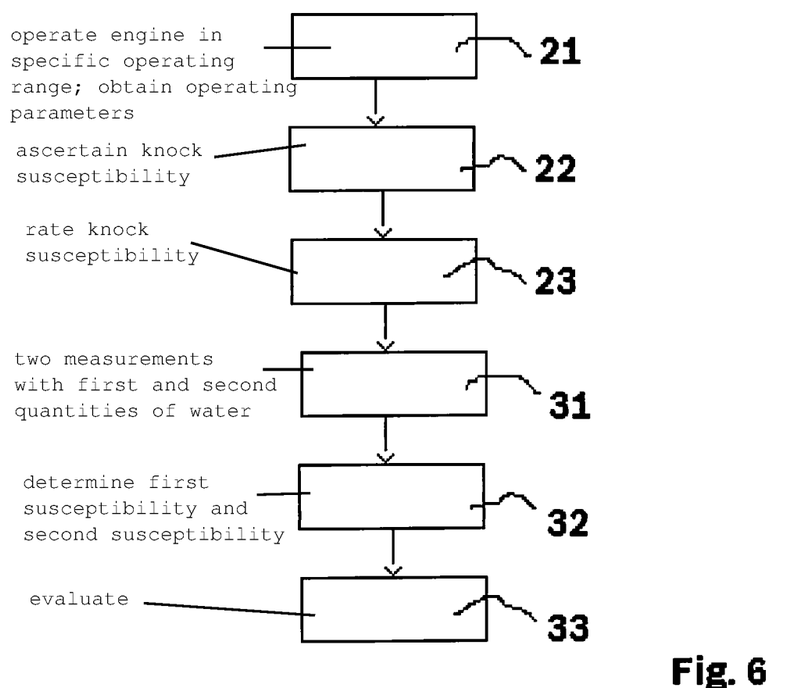
FIG. 6 shows a third method for water injection diagnosis.

FIG. 6 describes a method in which both advantages are combined with one another, and which exhibits only minor disadvantages.

The fundamental idea of the method according to FIG. 6 is firstly to carry out the method according to FIG. 4, and to carry out the method according to FIG. 5 only if that first method suggests a water injection malfunction. Method steps 21 to 23 of FIG. 6 correspond in terms of content to method steps 21 to 23 of FIG. 4. Step 23 of FIG. 6 differs, however, in that the result determined is not a malfunction in water injection but rather a potential malfunction. A potential malfunction does not yet mean that water injection is impaired and that corresponding replacement measures are being taken, but only that a more accurate diagnostic method, namely the method according to FIG. 5, will then be carried out. Because the result here is called not "faulty" but only "potentially faulty," the limit values (=threshold values) used for the method in step 23 can also be defined more tightly than is useful when only the method according to FIG. 4 is carried out. It is therefore permissible for the method according to steps 21 to 23 to diagnose the water injection, with a certain inaccuracy, too frequently as potentially faulty.

If a potential faulty water injection is identified in step 23, steps 31 to 33 then follow; these again correspond to the corresponding steps 31 to 33 of FIG. 5. It is only if a water injection malfunction has been finally diagnosed in step 33 that the water injection is diagnosed as faulty and corresponding counter-measures are initiated. As compared with continuous execution of the method according to FIG. 5, operation without water injection—which of course means operation with an elevated knock susceptibility—is thus relatively less often deliberately permitted in the case of the method according to FIG. 6. With the method according to FIG. 6, the engine is thus less often operated deliberately in an operating mode with an elevated knock susceptibility.

The methods of FIGS. 4, 5, and 6 have each been described for one cylinder. With a multi-cylinder internal combustion engine this method is performed individually for each cylinder, since each cylinder has, at least in part, components of a water injection system which are associated exclusively with that cylinder. Specifically, it is usual for each cylinder to have one individual water injector 4 associated with it, whereas usually pump 1 and water rail 3 represent one shared component for all cylinders. If each individual cylinder has its own water injector 4, then the diagnostic method must also be carried out individually for each cylinder; the diagnosis can, however, be effected successively for each cylinder, so that the cylinders are not all operated simultaneously with decreased (or no) water injection, and the cylinders are not all operated simultaneously with an elevated knock susceptibility. The occurrence of knocking combustion events can thus be decreased, since only one of the multiple cylinders is being operated in each case with an elevated knock susceptibility.

What is claimed is:

1. A method for diagnosing a water injection into a combustion chamber of an internal combustion engine, comprising:
    ascertaining a knock susceptibility of the internal combustion engine from signals of a knock sensor;
    evaluating the knock susceptibility to diagnose the water injection;
    operating the internal combustion engine in an operating range, the internal combustion engine being operated with a first and a second quantity of water injected into the combustion chamber, wherein the first and the second quantity are different from one another; and
    comparing the knock susceptibility of the internal combustion engine in the context of operation with the first and second quantity of water injected into the combustion chamber;
    wherein in a first step, the internal combustion engine is operated with the first quantity and in a second step with the second quantity, the first quantity being less than the second quantity; in the first step a first knock susceptibility and in the second step a second knock susceptibility are determined; and the water injection is diagnosed as functionally capable if the first knock susceptibility exceeds the second knock susceptibility by more than a threshold value; and the water injection is diagnosed as faulty if the first knock susceptibility exceeds the second knock susceptibility by less than the threshold value or if the first knock susceptibility is the same as or less than the second knock susceptibility.

2. The method as recited in claim 1, wherein the first quantity of water injected into the combustion chamber is equal to zero.

3. A method for diagnosing a water injection into a combustion chamber of an internal combustion engine, comprising:
    ascertaining a knock susceptibility of the internal combustion engine from signals of a knock sensor;
    evaluating the knock susceptibility to diagnose the water injection;
    operating the internal combustion engine in an operating range, the internal combustion engine being operated with a first and a second quantity of water injected into the combustion chamber, wherein the first and the second quantity are different from one another; and
    comparing the knock susceptibility of the internal combustion engine in the context of operation with the first and second quantity of water injected into the combustion chamber;
    wherein in a first step the internal combustion engine is operated with the first quantity and in a second step with the second quantity, the first quantity being greater than the second quantity; in the first step a first knock susceptibility and in the second step a second knock susceptibility are determined; and the water injection is diagnosed as functionally capable if the second knock susceptibility exceeds the first knock susceptibility by more than a threshold value; and the water injection is diagnosed as faulty if the second knock susceptibility exceeds the first knock susceptibility by less than the threshold value or if the second knock susceptibility is the same as or less than the first knock susceptibility.

4. The method as recited in claim 3, wherein the second quantity of water injected into the combustion chamber is equal to zero.

5. A method for diagnosing a water injection into a combustion chamber of an internal combustion engine, comprising:
    ascertaining a knock susceptibility of the internal combustion engine from signals of a knock sensor; and
    evaluating the knock susceptibility to diagnose the water injection;
    wherein in an operating range of the internal combustion engine, the knock susceptibility of the internal combustion engine is compared with a comparison value;
    wherein the water injection is diagnosed as faulty if the knock susceptibility of the internal combustion engine exceeds the comparison value.

6. The method as recited in claim 5, wherein in an internal combustion engine having multiple cylinders, the method for diagnosis is carried out individually for each cylinder.

7. The method as recited in claim 5, wherein the knock susceptibility is determined by one of: a combustion noise, a frequency of knocking combustion events, or a knock limit, ascertained by a knock control system, for an ignition angle.

8. A method for diagnosing a water injection into a combustion chamber of an internal combustion engine, comprising:
    ascertaining a knock susceptibility of the internal combustion engine from signals of a knock sensor; and
    evaluating the knock susceptibility to diagnose the water injection;
    wherein in an operating range of the internal combustion engine, the knock susceptibility of the internal combustion engine is compared with a comparison value;
    wherein in a first stage the water injection is diagnosed as potentially faulty if the knock susceptibility of the internal combustion engine exceeds the comparison values, and wherein, in a second stage, performing:
        operating the internal combustion engine in an operating range, the internal combustion engine being operated with a first and a second quantity of water injected into the combustion chamber, wherein the first and the second quantity are different from one another; and
        comparing the knock susceptibility of the internal combustion engine in the context of operation with the first and second quantity of water injected into the combustion chamber.

9. An apparatus for diagnosing a water injection into a combustion chamber of an internal combustion engine, comprising:
    a controller for ascertaining, from signals of a knock sensor, a knock susceptibility of the internal combustion engine and for evaluating the knock susceptibility for diagnosis of the water injection;

wherein in an operating range of the internal combustion engine, the knock susceptibility of the internal combustion engine is compared with a comparison value;
wherein the water injection is diagnosed as faulty if the knock susceptibility of the internal combustion engine exceeds the comparison value.

* * * * *